United States Patent [19]

Dolce

[11] 4,344,878

[45] Aug. 17, 1982

[54] FLAME RETARDANT, NON-DRIPPING LINEAR POLYESTER COMPOSITIONS

[75] Inventor: Thomas J. Dolce, Stirling, N.J.

[73] Assignee: General Electric Company, Pittsfield, Mass.

[21] Appl. No.: 226,412

[22] Filed: Feb. 19, 1981

Related U.S. Application Data

[63] Continuation of Ser. No. 125,214, Feb. 27, 1980, abandoned, which is a continuation of Ser. No. 638,806, Dec. 8, 1975, abandoned.

[51] Int. Cl.³ .............................................. C08K 5/59
[52] U.S. Cl. .................................... 524/409; 525/166; 525/416; 525/439; 524/508; 524/513
[58] Field of Search .............................. 525/165, 166; 260/45.75 B

[56] References Cited

U.S. PATENT DOCUMENTS

| | | | |
|---|---|---|---|
| 2,465,319 | 3/1949 | Whinfield et al. | 260/75 T |
| 3,047,539 | 7/1962 | Pengilly | 260/75 R |
| 3,557,053 | 1/1971 | Miller | 260/45.7 P |
| 3,671,487 | 6/1972 | Abolins | 260/873 X |
| 3,681,281 | 8/1972 | Juelke et al. | 260/45.7 P X |
| 3,830,771 | 8/1974 | Cohen et al. | 260/40 R |
| 4,033,927 | 7/1977 | Borman | 525/165 |

FOREIGN PATENT DOCUMENTS 2253207 10/1972 Fed. Rep. of Germany ...... 525/165
1358080 6/1974 United Kingdom .

*Primary Examiner*—J. Ziegler
*Attorney, Agent, or Firm*—Hedman, Casella, Gibson & Costigan

[57] ABSTRACT

Novel thermoplastic compositions are disclosed which include a linear polyester resin, a flame-retardant additive and polytetrafluoroethylene resin. These flame retardant, non-dripping compositions are particularly useful for molding applications.

8 Claims, No Drawings

FLAME RETARDANT, NON-DRIPPING LINEAR POLYESTER COMPOSITIONS

This is a continuation, of application Ser. No. 125,214 filed Feb. 27, 1980, which is a cont. of Ser. No. 638,806, filed Dec. 8, 1975, both abandoned.

This invention relates to novel flame-retardant non-dripping compositions that include a linear polyester resin, a flame-retardant additive and a polytetrafluoroethylene resin.

BACKGROUND OF THE INVENTION

High molecular weight linear polyesters and copolyesters of terephthalic and isophthalic acid are well known in the prior art. These polymers are described in Whinfield et al, U.S. Pat. Nos. 2,465,319 and Pengilly, 3,047,539 which are hereby incorporated by reference.

The linear polyesters have many desirable properties that make them useful for diverse applications. For certain applications, it is desirable to modify the inherently flammable nature of these polymers so that they are rendered self-extinguishing if they are ignited. In addition, it is desirable to render these polymers non-dripping when burning as the formation of flamming droplets of polymer tends to rapidly propagate fires which cause extensive damage, if not total destruction. Abolins, U.S. Pat. No. 3,671,487 solved this problem by adding to the linear polyester resin, a combination of glass reinforcement, a flame-retardant additive and polytetrafluoroethylene resin. These compositions were flame retardant and non-dripping.

It has now been found that flame retardant, non-dripping polyester compositions may be obtained by adding a flame retardant and polytetrafluoroethylene to a linear polyester resin without any glass reinforcement. Surprisingly, it has been found that these unreinforced compositions require less flame retardant than the glass reinforced compositions of Abolins in order to achieve a flame retardant, non-dripping composition when a minor amount of polytetrafluoroethylene resin is employed in these compositions. For example, the amount of antimony oxide that is used with certain halogenated flame retardants, may be cut in half when a minor amount of polytetrafluoroethylene resin is employed with these compositions. Also, the quantities of polytetrafluoroethylene that are required for providing a non-dripping composition are less than half the amount required by the prior art.

It is, therefore, a primary object of the present invention to provide improved flame retardant, non-dripping linear polyester compositions.

It is also an object of the invention to provide flame retardant, non-dripping linear polyester compositions that include lesser quantities of flame-retardant additives.

DETAILED DESCRIPTION OF THE INVENTION

The present invention provides a flame retardant, non-dripping thermoplastic molding composition which consists essentially of:
(a) a linear polyester resin;
(b) a flame retardant amount of a flame-retardant additive; and
(c) an amount of polytetrafluoroethylene resin that is sufficient to render the composition non-dripping.

The linear polyesters that are employed in the present invention are selected from the group consisting of polymeric glycol terephthalate and isophthalate esters having repeating units of the general formula:

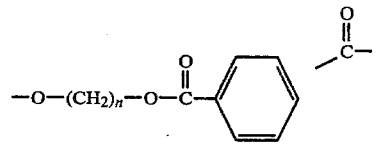

wherein n is a whole number of from 2 to 4, and mixtures of such esters.

The preferred polyester is poly(1,4-butylene terephthalate) although poly(ethylene terephthalate) may be used if special molding techniques are employed. Also included are the branched copolyesters of poly(1,4-butylene terephthalate).

These copolyesters are branched either by crosslinking through chemical linkages or by other known methods. They may contain minor amounts of e.g., from 0.5 to 15 mole percent of the total of 1,4-butylene units, of other aliphatic linkages, e.g., those of from 2 to 10 carbon atoms, such as dimethylene, trimethylene, hexamethylene, decamethylene and the like linkages, as well as cycloaliphatic, e.g., 1,4-dimethylene-cyclohexane linkages. In addition to the terephthalic acid units other dicarboxylic acid units such as adipic, naphthalene dicarboxylic, isophthalic and orthophthalic units may be present in small amounts, e.g, from about 0.5 to about 15 mole percent of the total acid units.

Especially useful are branched high melt viscosity poly(1,4-butylene terephthalate) resins, which include a small amount of a branching component containing at least three ester forming components. The branching component may be one which provides branching in the acid unit portion of the polyester, or in the glycol unit portion, or it may be a hybrid. Illustrative of such branching components are tri- or tetracarboxylic acids, such as trimesic acid, pyromellitic acid and lower alkyl esters thereof, and the like, or preferably, polyols, and especially preferably, tetrols such as trimethylolpropane; or dihydroxy carboxylic acids and hydroxydicarboxylic acids and derivatives such as hydroxyterephthalate and the like.

The relative amount of branching component may vary, but it is always kept at a minor proportion, e.g., of up to 5 mole percent maximum, for every 100 moles of the terephthalate units in the branched polyester. Preferably, the range of branching component included in the esterification mixture (and generally that included in the product) will be from 0.01 to 3 mole percent based on the terephthalate units. Especially preferably, it will comprise from about 0.02 to about 1 mole percent, based on the terephthalate component.

The polytetrafluoroethylene resins are commercially available or can be prepared by known processes. They are white solids obtained by polymerization of tetrafluoroethylene in aqueous media with free radical catalysts, e.g., sodium, potassium or ammonium peroxydisulfates at 100 to 1,000 psi at 0°–200° C. and preferably at 20°–100° C. as described in U.S. Pat. No. 2,393,967 which is hereby incorporated by reference. The preferred polytetrafluoroethylenes are commercially available from E. I. du Pont de Nemours and Company as Teflon 6.

The particular flame-retardant additive is not critical and many different materials may be employed.

The preferred flame-retardant additives are selected from the group consisting of halogen-containing compounds, phosphorus compounds and halogen-containing compounds in admixture with antimony oxide and the amount of flame retardant is from 0.5 to 40 parts by weight of the composition. The preferred compositions include from 0.5 to 35 parts by weight of a halogenated flame retardant and from 0.2 to 3 parts by weight of antimony oxide.

The useful flame-retardant materials may be halogen-containing compounds of phosphorus-containing compounds. Useful flame retardants are disclosed in U.S. Pat. Nos. 3,681,281; 3,557,053; 3,830,771 and U.K. Pat. No. 1,358,080, all of which are hereby incorporated by reference.

Among the useful halogen-containing compounds are those of the formula:

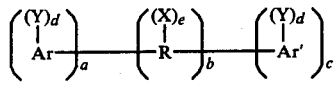

wherein R is an alkylene, alkylidene or cycloaliphatic linkage, e.g., methylene, ehtylene, propylene, isopropylene, isopropylidene butylene, isobutylene, amylene, cyclohexylene, cyclopentylidene, and the like; a linkage selected from the group consisting of ether; carbonyl; amine; a sulfur containing linkage, e.g., sulfide, sulfoxide, sulfone; a phosphorus-containing linkage; and the like. R can also consist of two or more alkylene or alkylidene linkages connected by such groups as aromatic, amino, ether, carbonyl, sulfide, sulfoxide, sulfone, a phosphorus-containing linkage, and the like. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula OE, where E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g, phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters, a, b and c represent whole numbers including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are biphenyls of which the following are representative:
2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,6-bis-(4,6-dichloronaphthyl)propane
2,2-bis-(2,6-dichlorophenyl)pentane
2,2-bis-(3,5-dichlorophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane The preparation of these and other applicable biphenyls are known in the art. In place of the divalent aliphatic group in the above examples may be substituted sulfide, sulfoxy, and the like.

Included within the above structural formula are substituted benzenes exemplified by 1,3-dichlorobenzene, 1,4-dibromobenzene, 1,3-dichloro-4-hydroxybenzene, hexachlorobenzene, hexabromobenzene, and biphenyls such as 2,2'-dichlorobiphenyl, 2,4'-dibromobiphenyl and 2,4'-dichlorobiphenyl.

Aromatic carbonate homopolymers having repeating units of the formula

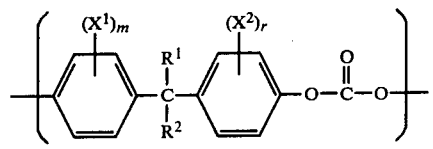

wherein $R^1$ and $R^2$ are hydrogen, (lower)alkyl or phenyl, $X^1$ and $X^2$ are bromo or chloro and m and r are from 1 to 4. These materials may be prepared by techniques well known to those skilled in the art.

Also aromatic carbonate copolymers in which from 25 to 75 wt. percent of the repeating units comprise chloro- or bromo-substituted dihydric phenol, glycol or dicarboxylic acid units.

The preferred halogen compounds for this invention are aromatic halogen compounds such as halogenated polycarbonates, chlorinated benzene, brominated benzene, chlorinated biphenyl, chlorinated terphenyl, brominated biphenyl, brominated terphenyl, or a compound comprising two phenyl radicals separated by a divalent alkylene or oxygen group and having at least two chlorine or bromine atoms per phenyl nucleus, and mixtures of at least two of the foregoing.

Especially preferred are hexabromobenzene and chlorinated biphenyls, alone, or mixed with antimony oxide.

In general, the preferred phosphate compounds are selected from elemental phosphorus or organic phosphonic acids, phosphonates, phosphinates, phosphonites, phosphinites, phosphene oxides, phosphenes, phosphites or phosphates. Illustrative are triphenyl phosphene oxide. This can be used alone or mixed with hexabromobenzene or a chlorinated biphenyl and, optionally, antimony oxide.

Typical or the preferred phosphorus compounds to be employed in this invention would be those having the general formula:

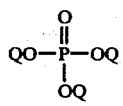

where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenyl-bis-(3,5,5'-trimethylhexyl phosphate), ethyldiphenyl phosphate, 2-ethylhexyl di(p-tolyl) phosphate, diphenyl hydrogen phosphate, bis(2-ethylhexyl)phenyl phosphate, tri(nonyl-phenyl)phosphate, phenylmethyl hydrogen phosphate, di(dodecyl) p-tolyl phosphate, tricresyl phosphate, triphenyl phosphate, dibutylphenyl phosphate, 2-chloroethyldiphenyl phosphate, p-tolyl bis(2,5,5'-trimethylhexyl)phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide or tetrakis(hydroxymethyl)phosphonium chloride. These flame retardant additives are commercially available.

The compositions of the invention will preferably consist essentially of 50 to 80 parts by weight of linear polyester, preferably poly(1,4-butylene terephthalate); from 0.5 to 35 parts by weight of a halogen containing polycarbonate, preferably a polycarbonate derived from tetrabromobisphenol-A and bisphenol-A; from 0.2 to 1 parts by weight of polytetrafluoroethylene resin or more preferably from 0.2 to 0.5 parts by weight of polytetrafluorethylene resin and from 0.2 to 3 parts by weight of antimony oxide.

Other stabilizers, processing aids, or nucleating agents may also be added to the composition of the present invention.

The compositions may be prepared by preblending the components and passing the preblend through an extruder or fluxing the preblend on a mill at a temperature dependent on the particular composition. The mixed composition may be pelletized and molded using conventional equipment and processing conditions.

When used herein, the term non-dripping is used to describe compositions which meet the standards of ASTM test method D-635 and Underwriters' Laboratories Bulletin No. 94. In a modification of this test, a molded piece of about 2½ × ½ × ⅛ inch is formed from the composition and if it does not drip upon ignition so that a piece of cotton 12 inches below is ignited and will extinguish itself within 30 seconds after two 10 second ignitions, the molded piece is considered to be non-dripping and flame retardant.

DESCRIPTION OF THE PREFERRED EMBODIMENTS

EXAMPLE 1

A non-dripping flame retardant composition is prepared with the following ingredients:

|  | Parts by Weight |
| --- | --- |
| poly(1,4-butylene terephthalate) | 70.8 |
| polytetrafluoroethylene resin* | 0.5 |
| polycarbonate copolymer of 50 mol. % of tetrabromobisphenol-A and 50 mol. % of bisphenol-A (having an I.V. of about 0.35 in CHCl$_3$ at 30° C.) | 26.0 |
| antimony oxide (Sb$_2$O$_3$) | 2.5 |

*Teflon 6, E. I. duPont de Nemours & Company, average particle size 0.3–0.7 mm.

In addition, the formulation includes minor amounts of conventional antioxidants.

This intimately blended composition is injection molded and the test pieces do not drip when ignited and the U.L.-94 rating is V-O.

The procedure is repeated using as a control formulation (without polytetrafluoroethylene):

|  | Parts by Weight |
| --- | --- |
| poly(1,4-butylene terephthalate) | 68.8 |
| polycarbonate copolymer of 50 mol. % tetrabromobisphenol A and 50 mol. % of bisphenol A | 26.0 |
| antimony oxide (Sb$_2$O$_3$) | 5.0 | and small amounts of conventional antioxidants.

In contrast to the first formulation (according to this invention) which contains only 50% the amount of Sb$_2$O$_3$, the ⅛" thick test pieces molded from control formulations drip flaming resin when burning, even though they exhibit a V-O rating in the U.L.-94 test.

Obviously, variations are possible in the light of the above-detailed description. For example, if the procedure of Example 1 is repeated, lowering the amount of polytetrafluoroethylene from 0.5 to 0.1 parts by weight, a composition will be obtained which still is non-dripping, when burning.

If the procedure of Example 1 is repeated, substituting poly(ethylene terephthalate) for the poly(1,4-butylene terephthalate), and molded with conventional modifications, e.g., longer cooling times, to accommodate the relatively slower rate of crystallization of this polyester resin, a composition according to this invention will be obtained.

If the procedure of Example 1 is repeated, substituting for the halogenated polycarbonate copolymer flame retardant additive, the following:

hexabromobenzene, 10 parts by weight;

highly chlorinated diphenyl (Arochlor 1268, Monsanto Co.), 10 parts by weight;

triphenyl phosphate, 10 parts by weight;

cresyldiphenyl phosphate, 10 parts by weight, compositions according to this invention will be obtained.

Other modifications and variations of the present invention are possible in the light of the above teachings. It is, therefore, to be understood that changes may be made in the particular embodiments of the invention described which are within the full intended scope of the invention as defined by the appended claims.

I claim:

1. A flame retardant, non-dripping thermoplastic molding composition which consists essentially of:
   (a) a linear polyester resin;
   (b) a flame retardant amount of a flame retardant additive consisting essentially of a halogen containing polycarbonate in admixture with antimony oxide; and
   (c) an amount of polytetrafluoroethylene resin that is sufficient to render the composition non-dripping.

2. A composition as defined in claim 1 wherein said polyester is selected from the group consisting of polymeric glycol terephthate and isophthalate esters having repeating units of the general formula:

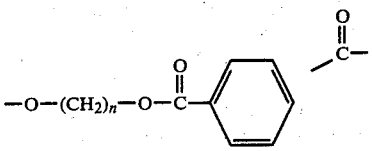

wherein n is a whole number of from 2 to 4, and mixtures of such esters.

3. A composition as defined in claim 1 wherein said polyester is poly(1,4-butylene terephthalate).

4. A composition as defined in claim 1 wherein sad polyester is poly(ethylene terephthalate).

5. A composition as defined in claim 1 wherein said flame retardant additive is present in an amount of 0.5 to 40 parts by weight of the composition.

6. A composition as defined in claim 1 wherein said halogen containing polycarbonate is derived from tetrabromobisphenol-A and bisphenol-A.

7. A composition as defined in claim 1 which includes from 50 to 80 parts by weight of poly(1,4-butylene terephthalate) from 0.5 to 35 parts by weight of a halogen containing polycarbonate; from 0.2 to 1 part by weight of polytetrafluoroethylene resin and from 0.2 to 3 parts by weight of antimony oxide.

8. A flame retardant, non-dripping thermoplastic molding composition which consists of:
   (a) from 50 to 80 parts by weight of poly(1,4-butylene terephthalate) resin;
   (b) from 0.5 to 35 parts by weight of a polycarbonate derived from tetrabromobisphenol-A and bisphenol-A;
   (c) from 0.2 to 1 part by weight of polytetrafluoroethylene resin; and
   (d) from 0.2 to 3 parts by weight of antimony oxide.

* * * * *

UNITED STATES PATENT AND TRADEMARK OFFICE
CERTIFICATE OF CORRECTION

PATENT NO. : 4,344,878
DATED : August 17, 1982
INVENTOR(S) : Thomas J. Dolce

It is certified that error appears in the above—identified patent and that said Letters Patent is hereby corrected as shown below:

In column 7, on line 35, change "terephthate" to read --terephthalate--; and

In column 8, on line 13, change "sad" to read --said--.

Signed and Sealed this

Twenty-first Day of December 1982

[SEAL]

Attest:

Attesting Officer

GERALD J. MOSSINGHOFF

Commissioner of Patents and Trademarks